United States Patent Office 2,815,275
Patented Dec. 3, 1957

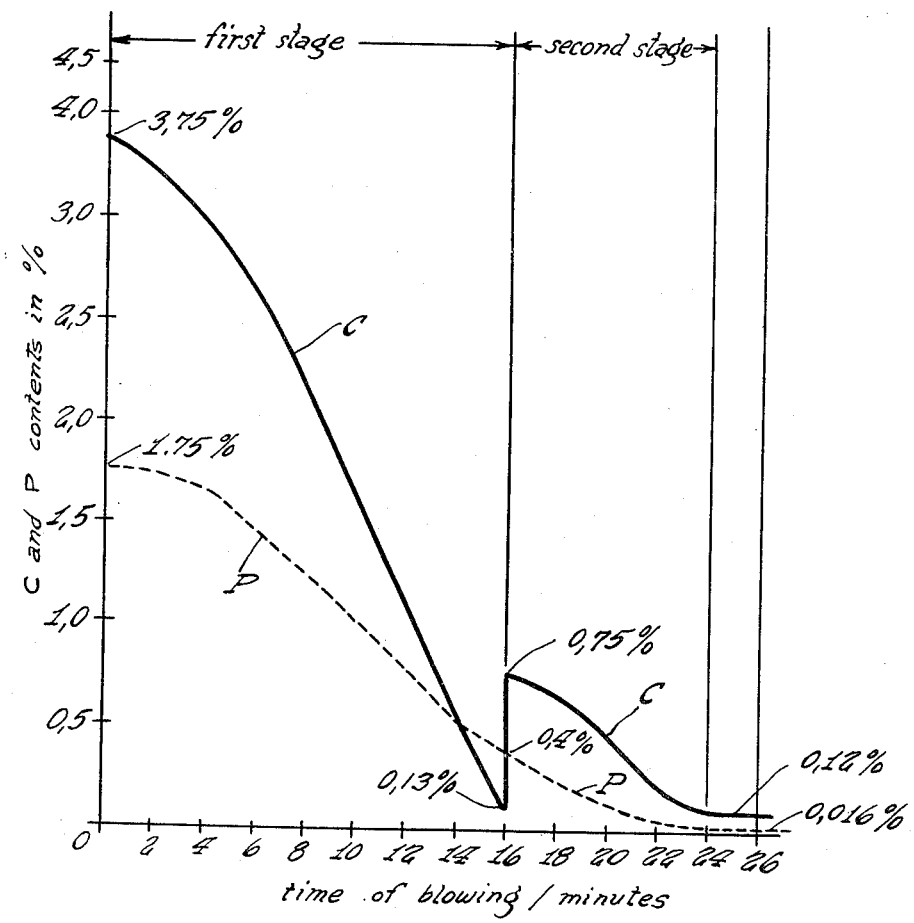

2,815,275

METHOD FOR REFINING PIG IRON

Adolf Richter, Witten-Bommern, Germany, assignor to Brassert Oxygen Technik A. G.

Application November 1, 1955, Serial No. 544,232

Claims priority, application Germany November 2, 1954

8 Claims. (Cl. 75—52)

This invention relates to a method for refining pig iron containing 3.5 to 4.0% carbon, 0.50 to 1.50 manganese, more than 0.2% and up to 2.0% phosphorus, 0.05 to 0.08% sulfur, the remainder being iron. After a well known process the refining of iron of this composition is accomplished by introducing in a basic lined vessel iron in molten state, an iron-oxide bearing material, and a lime-containing basic slag-forming reactant in an amount to obtain a basic slag, and injecting pure oxygen onto the surface of this charge. In this process, the gaseous oxygen is introduced by a jet directed against the surface on the charge. This refining process should be adapted for use in the production of steel of low phosphorus content while at the same time avoiding the introduction of excessive nitrogen into the steel.

It is a disadvantage in the above described refining process that the amount of carbon in the pig iron decreases more rapidly, than the phosphorus. During the first phase of the process the reduction of phosphorus is extremely slow. Removal of the phosphorus thus requires the blowing to be extended over a rather long period of time with the additional disadvantage that, in the absence of carbon, a large amount of iron is lost by oxidization. Furthermore, the final product is a steel containing practically no carbon, which is also undesirable since some percentage of carbon is required in most kinds of steel.

Therefore, several attempts have been made to accelerate the removal of the phosphorus content of the iron and, in particular, to arrive at a tolerably small amount of phosphorus even before the carbon has vanished almost completely. One way of achieving this result is to add to the charge a basic slag containing lime, a certain amount of oxidizing material such as iron ore and fluxing material like soda and at the same time reduce the amount of oxygen blown onto the surface of the charge through the jet. The presence of a high basic, iron-oxides and fluxing material containing slag accelerates the removal of the phosphorus, while the reduction in oxygen blown decelerates the oxidation of the carbon. The disadvantage of this refining process is that the intentional delay in the carbon removal increases the total time of the process to almost twice the time required in the older method.

Now it is one of the objects of my invention to produce a steel containing a very small percentage of phosphorus, say 0.02 percent, and an amount of carbon which makes the steel usable for many purposes wtihout the necessity of later subjecting it to an additional process of re-carbonization. It is a further object of my invention to obtain a steel extremely low in nitrogen by a process requiring less time than the process referred to above.

In my improved method I make use of gaseous oxygen blown under a pressure of 7 to 12 atmospheres onto the surface by means of a jet, the outlet end of which is positioned slightly above the slag surface. The refining is done in two steps or phases, and an undiminished amount of oxygen is applied during both steps.

In the first step, the greater proportion of both the carbon and the phosphorus are removed under a high basic slag containing lime, iron oxides and fluxing material. The carbon is decreased to less than 0.2 percent and preferably to 0.1 percent, and the phosphorus content to such a degree that it does not exceed five times the amount of carbon still present.

At this state the high basic and reactive slag is drawn off and pig iron pure in phosphorus added to the charge. Due to this addition of pig iron the total carbon content of the charge is increased again to more than 0.2 percent and at least twice and at most fifteen times the carbon percentage present in the remaining charge. Thereafter, a new dephosphorizing slag rich in lime and containing iron oxides and fluxing material such as soda is put upon the charge and oxygen blowing is resumed at full strength until the desired carbon- and phosphorus contents of the steel are obtained.

Instead of pig iron pure in phosphorus other carbonizing materials may be used, such as the material obtained by pulverizing carbon electrodes. Oxygen blowing at full strength is to be understood here as the application of an oxygen amount per unit of time which exceeds by at least 10 percent the amount used in the customary process of converter-refining pig iron of small phosphorus contents by blowing oxygen onto and into the surface of the charge.

By the use of my improved process, the time required for refining as well as the consumption of oxygen are reduced considerably. Economically, my method is hardly inferior to that of the well-known method now in use to convert phosphorus containing pig iron by blowing oxygen upon and into the surface of the charge.

The first step of my process may be shortened considerably by making use of an oxygen jet of a width greater than customarily used. Only a few minutes are needed to complete the removal of the phosphorus in the second step of my method. It is important that the slag applied in the second step should be capable of reacting with the phosphorus to make certain that the amount to be removed is rapidly incorporated in that slag. The required reaction occurs, for example, if a solid or liquid slag coming from the open hearth- or converter-steel process is used. These slags need not contain more than 2.0% $P_2O_5$. During my process, the undesirable enriching of the steel with nitrogen is avoided.

For a better understanding of the present invention, reference may be had to the accompanying drawing in which the single figure illustrates diagrammatically a specific embodiment of the method according to the present invention. As illustrated in the drawing, it will be seen that a charge of molten pig iron containing 3.75% carbon and a 1.75% phosphorus is introduced into a reaction vessel such as a converter and is provided with a basic dephosphorizing slag cover containing lime, iron ore and a fluxing material, such as, soda. The charge is refined by blowing a blast of substantially pure oxygen against the surface of the charge at a pressure of 7 to 12 atmospheres to part the slag cover and permit direct contact between the oxygen and the metal. The velocity and volume are such that the carbon content is reduced to 0.13% and the phosphorus content is reduced to about 0.5% or slightly above after 16 minutes of blowing. The blowing operation is conducted with a nozzle spacing and with a nozzle size which are in accordance with recognized practice in oxygen converter operations.

At the end of the initial period of blowing, that is, 16 minutes, the slag is poured off and finely divided carbon is added to the molten metal to increase the carbon content to 0.75% without substantially increasing the phosphorus content of the charge. Thereafter a new basic dephosphorizing slag containing lime, iron oxide and soda is introduced and blowing with oxygen is continued for an additional 10 minutes until the carbon content of the molten metal is reduced to 0.12% and the phosphorus content to 0.016%.

It will be understood that the blowing rate can be increased or decreased to control the final carbon and phosphorus content of the metal depending upon the composition of the metal desired.

I claim:

1. A method for refining pig iron comprising: introducing into a basic lined vessel, a charge of molten ferrous metal containing 3.5 to 4.0 percent carbon and more than 0.2 percent of phosphorus, and a basic, slag-forming and lime-containing material and iron-oxide; blowing gaseous oxygen against the surface of the charge under a pressure of about 7 to 12 atm. until the carbon content of the charge has reduced to less than 0.2 percent and the phosphorus content to less than 1.0%, removing the slag; recarbonizing the molten metal by adding to it carbon to increase the amount of carbon in it to at least twice the carbon percentage remaining in said molten metal while maintaining the phosphorus content substantially unchanged; introducing a de-phosphorizing slag into the vessel; and blowing gaseous oxygen under a pressure of about 7 to 12 atm. against the surface of said re-carbonized molten metal to reduce carbon and phosphorus contents to desired lower values.

2. The method set forth in claim 1 in which the re-carbonizing of the charge is accomplished by adding pig iron pure in phosphorus to the charge.

3. The method set forth in claim 1 in which the re-carbonizing of the charge is accomplished by adding non-ferrous carbon-containing material to the charge.

4. The method set forth in claim 1 in which the basic slag charged after re-carbonizing the charge is an open hearth slag containing $P_2O_5$ in an amount not exceeding 2.0 percent.

5. The method set forth in claim 1 in which the basic slag charged after re-carbonizing the charge of molten metal is an oxygen-converter slag containing $P_2O_5$ in an amount not exceeding 2.0%.

6. A method for refining pig iron comprising: introducing into a basic lined vessel a charge of molten pig iron containing 3.5 to 4.0 percent carbon and more than 0.2 percent of phosphorus and a basic, slag-forming and lime-containing material and iron oxide; blowing gaseous oxygen against the surface of said charge under a pressure of about 7 to 12 atm. until the carbon content of the charge has decreased to less than 0.1 percent and the phosphorus content to less than 0.5 percent; removing the slag; re-carbonizing the charge by adding to it carbon to increase its carbon content to at least twice the carbon percentage present in said charge while maintaining its phosphorus content substantially unchanged; introducing a de-phosphorizing slag into said vessel; and blowing gaseous oxygen under a pressure of about 7 to 12 atm. upon and into the surface of the said re-carbonized charge covered by the de-phosphorizing slag to reduce the carbon and phosphorus contents of the charge to desired lower values.

7. A method for refining pig iron comprising: introducing into a basic lined vessel, a charge of molten pig iron containing 3.5 to 4.0 percent carbon and more than 0.2 percent of phosphorus and a basic, slag-forming and lime-containing material and iron oxide, blowing gaseous oxygen against the surface of said charge under a pressure of about 7 to 12 atm. until the carbon content of the charge has decreased to less than 0.2 percent and the phosphorus content to less than 1.0%; removing the slag; re-carbonizing the charge by adding to it carbon to increase the percentage of carbon in the charge to between twice and fifteen times the carbon percentage remaining in said charge; introducing a de-phosphorizing slag into the vessel; and blowing gaseous oxygen under a pressure of about 7 to 12 atm. upon and into the surface of the said re-carbonized charge covered by the de-phosphorizing slag to reduce the carbon and phosphorus contents to desired lower values.

8. A method for refining pig iron comprising: introducing into a basic lined vessel a charge of molten pig iron containing 3.5 to 4.0 percent carbon and more than 0.2 percent of phosphorus and a basic, slag-forming and lime-containing material and iron oxide, blowing gaseous oxygen against the surface of said charge under a pressure of about 7 to 12 atm. until the carbon content of the charge has decreased to less than 0.1 percent and the phosphorus content to less than 0.5 percent; removing the slag; re-carbonizing the remaining charge by adding to it carbon in an amount to increase the carbon content of the charge between twice and fifteen times the carbon percentage remaining in said charge; introducing a de-phosphorizing slag into said vessel; and blowing gaseous oxygen under a pressure of about 7 to 12 atm. against the surface of the said re-carbonized charge covered by the de-phosphorizing slag to reduce the carbon and phosphorus content of the charge to desired lower values.

References Cited in the file of this patent

UNITED STATES PATENTS

| | | |
|---|---|---|
| 1,233,970 | Bronn | July 17, 1917 |
| 2,050,803 | Perrin | Aug. 11, 1936 |
| 2,440,564 | Allard | Apr. 27, 1948 |
| 2,668,759 | Tenenbaum | Feb. 9, 1954 |